C. A. WOOD.
REVERSING AND STEERING DRIVING GEARING.
APPLICATION FILED APR. 6, 1917.
1,241,184.
Patented Sept. 25, 1917.
3 SHEETS—SHEET 1.
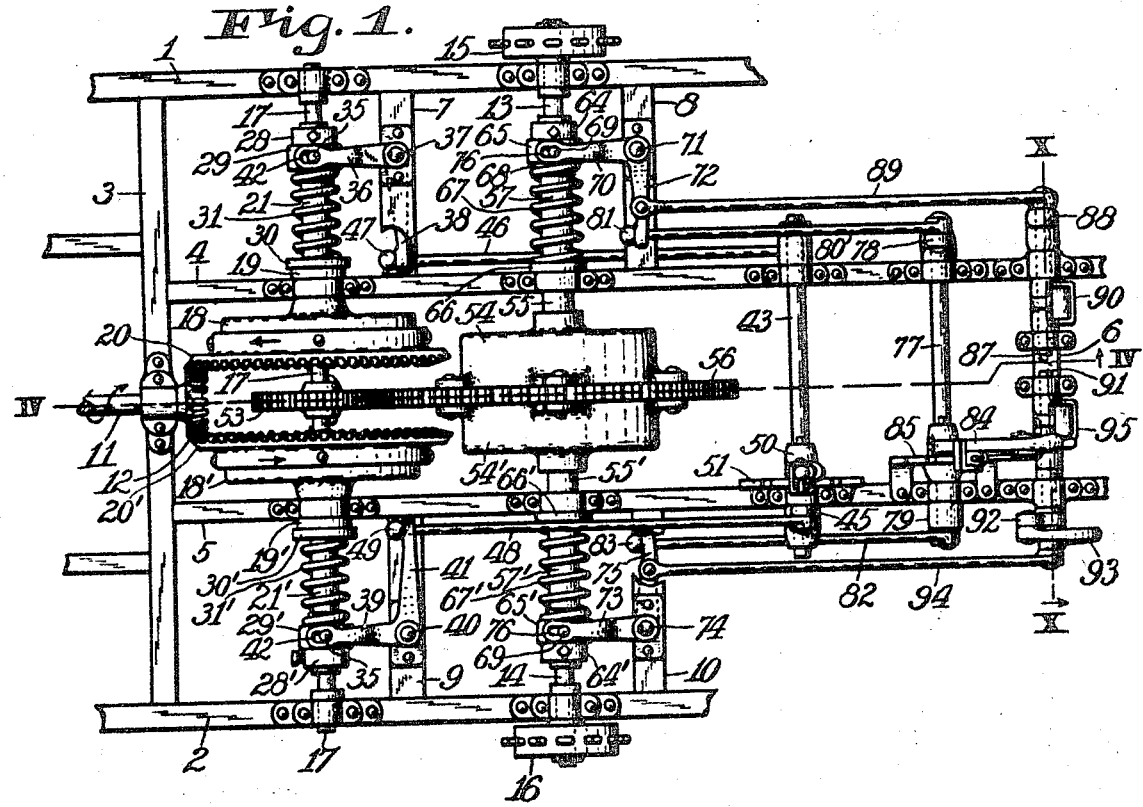
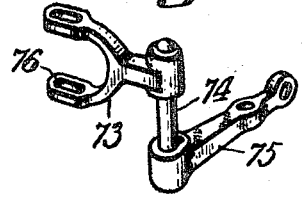
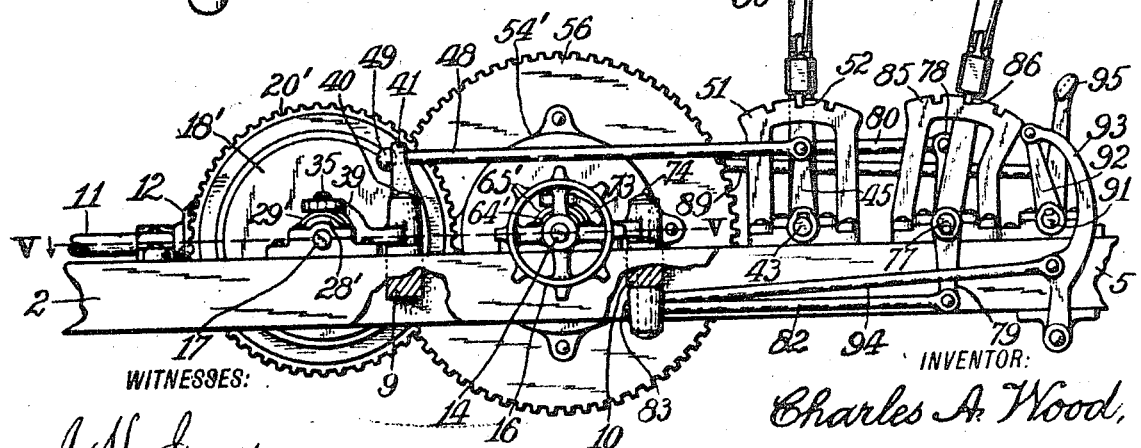
WITNESSES:
J. H. Gardner
Myrtle McCoy
INVENTOR:
Charles A. Wood,
BY
E. T. Silvius,
ATTORNEY.

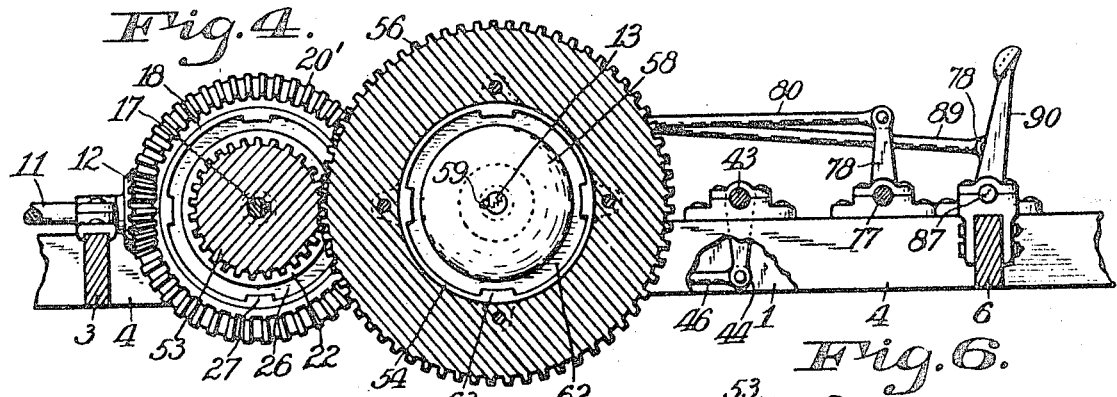
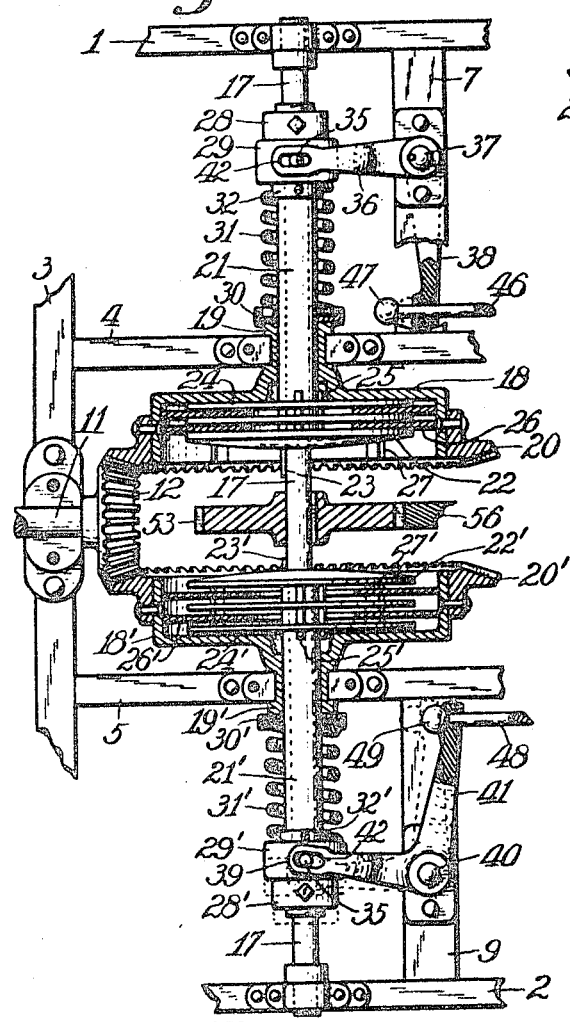
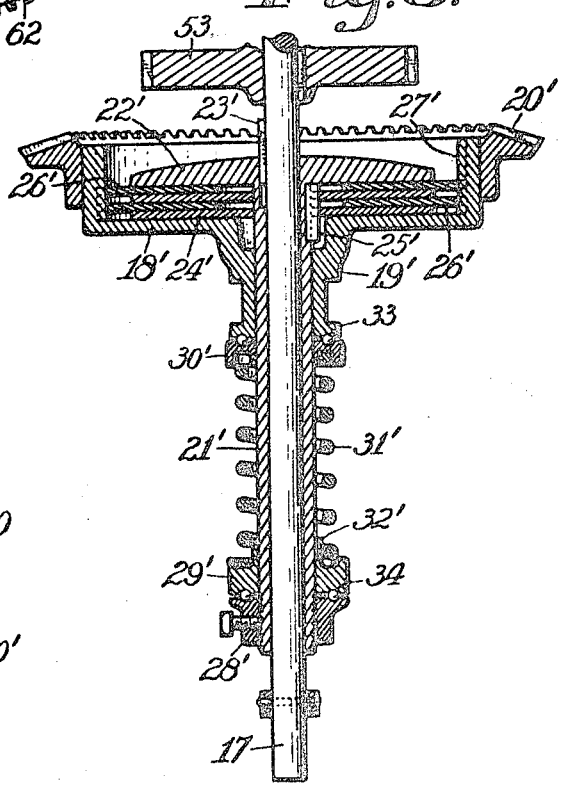
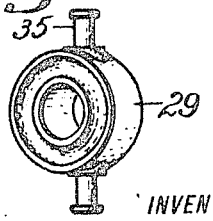

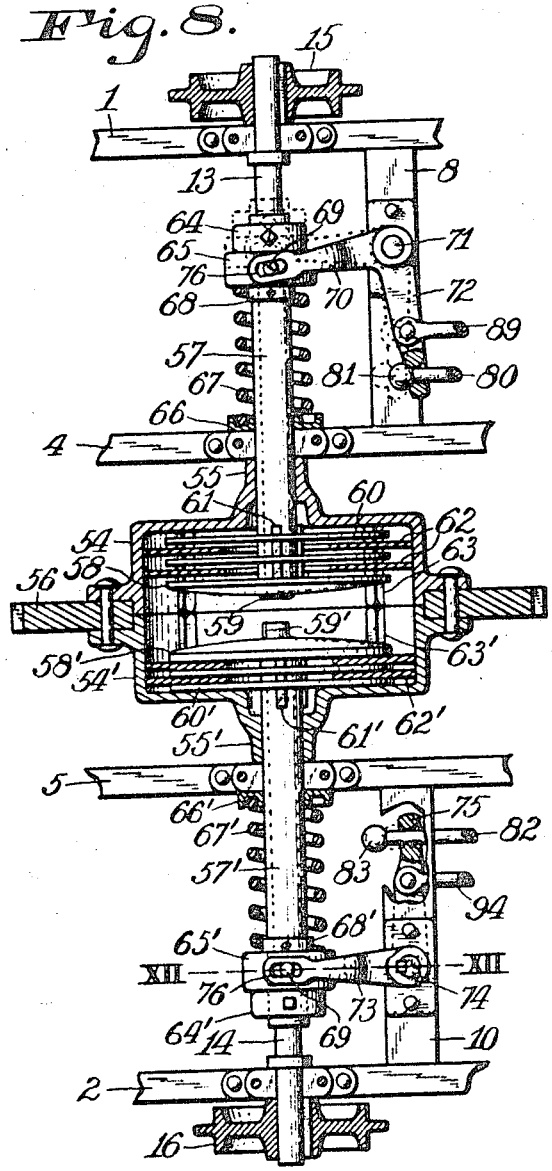
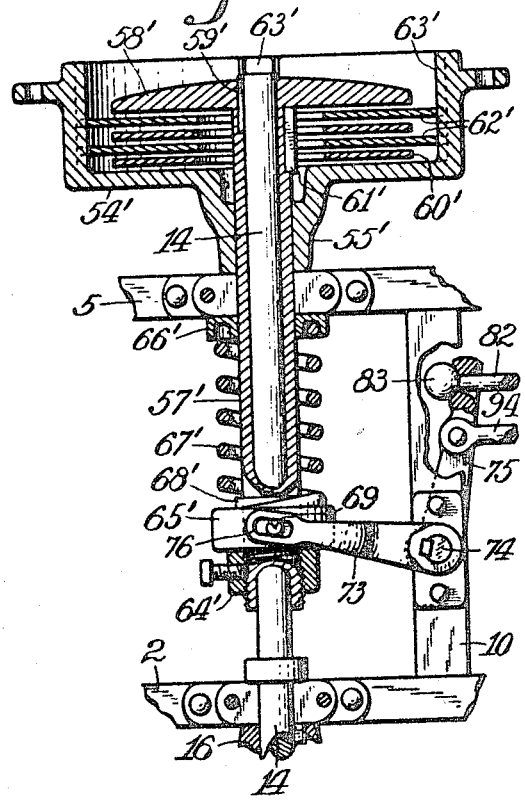
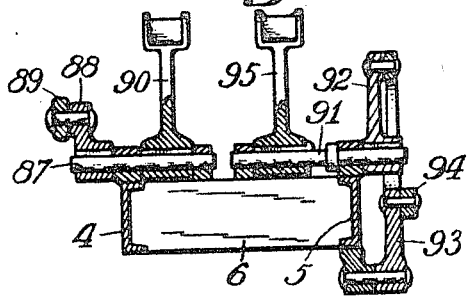
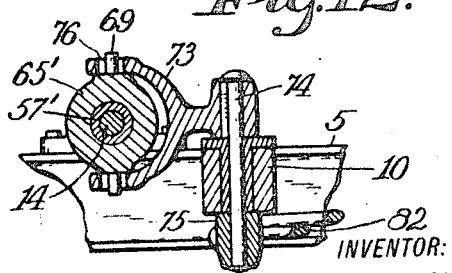

UNITED STATES PATENT OFFICE.

CHARLES A. WOOD, OF CARR CREEK TOWNSHIP, MITCHELL COUNTY, KANSAS.

REVERSING AND STEERING DRIVING-GEARING.

1,241,184.  Specification of Letters Patent.  Patented Sept. 25, 1917.

Application filed April 6, 1917. Serial No. 160,220.

*To all whom it may concern:*

Be it known that I, CHARLES A. WOOD, a citizen of the United States, residing in Carr Creek township, in the county of Mitchell and State of Kansas, have invented a new and useful Reversing and Steering Driving-Gearing, of which the following is a specification, reference being had to the accompanying drawings and to the letters and figures of reference marked thereon.

This invention relates to gearing or mechanism for transmitting power to two driving wheels or to either one of the two wheels and in either one of the two directions of motion, the invention having reference more particularly to gearing of the above-mentioned character that is adapted to be promptly controlled in its various operations, and also to controlling apparatus for the gearing.

An object of the invention is to provide reversing controllable gearing that shall be so constructed as to be suitable for use in the construction of tractors, stackers and other machines and whereby motion may be transmitted from a single driving shaft to a plurality of driving wheels and in either normal forward or the reverse direction. Another object is to provide improved gearing and apparatus of the above-mentioned character whereby tractors or other motor driven vehicles may be steered or assisted by the driving power in making short turns on the road and especially in fields where good roads are lacking and the ground more or less soft. A further object is to provide improved mechanism of the above-mentioned character which shall include means whereby transmitted power may be modified so as to be transmitted to a relatively less degree of power to either one or all of a plurality of driving wheels at the will of the operator; which improved gearing or mechanism shall be of simple and inexpensive construction, reliable in operation and durable and economical in use.

With the above-mentioned and other objects in view, the invention consists in an improved reversing and controllable gearing for transmitting power; the invention consisting also further in certain novel parts and in the combinations and arrangements of parts as hereinafter particularly described and further defined in the accompanying claims.

Referring to the drawings,—Figure 1 is a top plan of the gearing as preferably constructed; Fig. 2 is a perspective view of one of the clutch controlling devices; Fig. 3 is a side elevation of Fig. 1; Fig. 4 is a longitudinal section on the line IV—IV on Fig. 1; Fig. 5 is a fragmentary sectional plan on the line V—V on Fig. 3; Fig. 6 is a fragmentary central section also on the line V—V on an enlarged scale and showing various parts in different positions; Fig. 7 is a perspective view of one of the clutch controlling devices; Fig. 8 is a fragmentary sectional plan also on the line V—V; Fig. 9 is a fragmentary sectional plan also on the line V—V on an enlarged scale and showing various parts in different positions; Fig. 10 is a section on the line X—X on Fig. 1; Fig. 11 is a perspective view of a number of connected parts of the controlling apparatus; and, Fig. 12 is a section on the line XII—XII on Fig. 8.

Similar reference characters on the different figures of the drawings indicate corresponding elements or features of construction herein referred to and described.

The invention requires a suitable frame which may be variously constructed and for the purposes of the invention as illustrated may comprise two side-bars 1 and 2 to which a cross-bar 3 is connected, two intermediate bars 4 and 5 connected to the cross-bar, a cross-bar 6 connected to the intermediate bars, two cross-bars 7 and 8 connected to the side-bar 1 and the intermediate bar 4, and two cross-bars 9 and 10 connected to the side-bar 2 and the intermediate bar 5.

The mechanism comprises a driving shaft 11 which is intermediate of and parallel to the side-bars of the frame, the driving shaft being suitably journaled upon the cross-bar 3 and having a bevel pinion 12 secured thereto. At a suitable distance from the cross-bar 3, two driven shafts 13 and 14 are arranged in alinement each with the other and suitably supported rotatably by the frame, one driven shaft being supported by the side-bar 1 and the intermediate bar 4 and the other by the side-bar 2 and the intermediate bar 5. A suitable driving wheel 15 is secured to the driven shaft 13, a similar driving wheel 16 being secured to the driven shaft 14, the driving wheels in the present case being shown as sprocket wheels whereby power may be transmitted by means of sprocket chains. The motion and power for actuating the driving wheels are transmitted from the pinion 12 to the driven shafts by the means hereinafter described in detail.

A reversing shaft 17 is rotatably mounted on the frame parallel to the driven shafts 13 and 14 and between them and the pinion 12, the end portions of the shaft 17 being supported by the side-bars 1 and 2. The shaft 17 is substantially supported also by the intermediate bars 4 and 5, preferably as hereinafter described. Two dished wheels 18 and 18' are provided which are adapted to constitute casings and clutch members and they have hollow hubs 19 and 19' respectively that are rotatably supported on the intermediate bars 4 and 5 respectively, the shaft 17 extending through the hubs. One wheel has a bevel gear wheel member 20 fixed thereon that is in mesh with the pinion 12 on one side of the driving shaft 11, the companion wheel 18' having a bevel gear wheel member 20' fixed thereon that is in mesh also with the pinion 12 on the opposite side of the shaft 11, so that when the pinion is rotated the wheel 18 is rotated in one direction and the wheel 18' in the opposite direction. A sleeve 21 is arranged on the shaft 17 to rotate therewith and extends rotatably through the hub 19, a main clutch disk 22 being fixed to the sleeve and arranged in the wheel 18, a spline 23 connecting the disk 22 with the shaft 17 to enable the disk to rotate the shaft and permit the disk and the sleeve to move longitudinally on the shaft.

A sleeve 21' is arranged also on the shaft 17 and extends through the hub 19', a clutch disk 22' being fixed on the sleeve and connected with the shaft by means of a spline 23', the disk 22' being arranged in the wheel 18'. A suitable number of clutch disks 24 are arranged in the wheel 18 and connected to the sleeve 21 by means of splines 25 so as to assist in rotating the sleeve and the shaft. A suitable number of clutch disks 26 are arranged also in the wheel 18 between the disk 22 and the web of the wheel 18 and are connected with the wheel by means of splines 27 so as to be rotated by the wheel when the clutch disks are forcibly pressed together. Similar clutch disks 24' are arranged in the wheel 18' and connected with the sleeve 21' by means of splines 25', other disks 26' being connected with the wheel by means of splines 27'.

The two clutch systems for determining the direction of motion of the shaft 17 are held in operative position by means of springs and for this purpose a collar 28 is secured to the sleeve 21, preferably so as to be adjustable on the sleeve, and between the collar 28 and the hub 19 an annular spring seat 29 is arranged also on the sleeve adjacent to the collar 28 and so as to be rotatable and also movable longitudinally on the sleeve. A spring seat 30 is arranged on the sleeve 21 so as to not be movable longitudinally on the sleeve but is rotatable relatively to the sleeve and preferably is arranged against the adjacent end of the hub 19. A coil spring 31 is arranged on the sleeve 21 under compression between the spring seats 29 and 30, so that the spring indirectly acting on the collar 28 draws the clutch disk 22 forcibly to clamp the clutch disks together and thus effect connection between the wheel 18 and the shaft 17. When the spring seat 29 is forcibly moved in the opposite direction so as to further compress the spring 31, the disks are released and preferably are slightly separated by means of a collar 32 fixed to the sleeve 21 in contact with the spring seat 29 so as to enable the latter to longitudinally move the sleeve when the spring is further compressed. Similar controlling mechanism is provided for the companion clutch system and comprises a collar 28' secured to the sleeve 21', a spring seat 29' arranged on the sleeve, a spring seat 30' backed against the hub 19', a spring 31' arranged between the spring seats and a collar 32' secured to the sleeve 21' adjacent to the spring seat 29'. It will be understood that anti-friction bearings are provided where desired, as for instance ball bearings 33 may be suitably arranged between the spring seats and the hubs 19 and 19' and also similar bearings 34 between the opposite spring seats and the collars 28 and 28', as indicated in Fig. 6.

For the purpose of operating the spring seat 29 each spring seat is provided with lugs 35 and a shifting fork 36, the latter being secured to a pivotal shaft 37 which is rotatively mounted in vertical arrangement in the frame-bar 7, and an operating arm 38 secured to the shaft. A shifting fork 39 for the spring seat 29' is provided which is mounted on a pivot 40 that is supported on the frame bar 9, the shifting fork being provided with an operating arm 41. Each shifting fork has slots 42 receiving the lugs 35 of the spring seats. A rock-shaft 43 is mounted on the frame bars 4 and 5 and has a downwardly-extending arm 44 fixed thereon, the shaft having also an upwardly-extending arm 45 thereon. A pull rod 46 is connected to the arm 44 and extends through a suitable aperture in the operating arm 38 so that it may be pushed through the arm, the pull rod having a head 47 thereon normally engaging the farther side of the arm 38. A pull rod 48 is connected to the arm 45 and extends through the operating arm 41, being also provided with a head 49 to engage the farther side of the arm 41. A lever 50 is secured to the shaft 43 and extends upward adjacent to a notched quadrant 51, the lever being provided with a latch 52 adapted to coöperate with the quadrant to latch the lever. The arrangement is such that when the lever 50 is in mid position the arms 44 and 45 permit full action of the springs 31 and 31' so as to clutch both wheels 18 and 18' to the shaft 17. If the lever 50 be moved in one direction one of the bevel gear wheels will be released from the shaft and permit the opposite gear wheel to rotate the shaft in one direction, the latter being released when the lever is moved in the opposite direction. A spur-tooth gear wheel 53 is secured to the shaft 17 between the wheels 18 and 18' for transmitting motion to the driving wheels 15 and 16 as hereinafter described in detail.

A hollow gear wheel is provided which is designed to constitute a casing and clutch member, being preferably composed of two dished sections 54 and 54' secured together and having hollow hubs 55 and 55' respectively that are rotatably supported substantially on the frame bars 4 and 5 between which the hollow wheel or casing is arranged so as to rotate on the shafts 13 and 14, the wheel having a spur-tooth wheel member 56 thereon, preferably formed separately and secured to the two sections of the wheel, the teeth of the wheel being in mesh with the wheel 53. A sleeve 57 is arranged on the shaft 13 and extends through the hub 55 to the interior of the hollow wheel and a main clutch disk 58 is fixed on the inner end of the sleeve, the disk and the sleeve being connected with the shaft by means of a spline 59. Clutch disks 60 are arranged between the disk 58 and the side wall of the section 54 of the hollow wheel and connected to the sleeve 57 by means of splines 61 or similar devices, other clutch disks 62 being arranged between the disks 58 and 60 and connected to the peripheral portion of the section 54 by means of splines 63. A collar 64 is secured to the sleeve 57 and adjacent thereto a spring seat 65 is loosely arranged on the sleeve. The sleeve 57 as shown being rotatively supported in a suitable box on the frame-bar 4 and directly supporting a hub 55, a spring seat 66 is seated against the journal box, a coil spring 67 being seated under compression against the spring seat and also against the spring seat 65. Preferably a collar 68 is secured to the sleeve 57 adjacent to the spring seat 65 so as to be encircled by the adjacent end portion of the spring. One clutch system thus constructed enables the hollow gear wheel to rotate the shaft 13 and permits the wheel to rotate on the shaft when it may be so desired. For independently driving the opposite shaft 14 a sleeve 57' is arranged on the shaft and extends through the hub 55' into the hollow gear wheel, and to its inner end a clutch disk 58' is secured and connected with the shaft 14 by means of a spline 59', clutch disks 60' being connected to the sleeve by means of splines 61' or similar devices to coöperate with other clutch disks 62' that are connected to the wheel section 54' by means of splines 63'. A sleeve 64' is secured to the sleeve 57' and adjacent thereto a spring seat 65' is loosely arranged on the sleeve. A spring seat 66' is arranged adjacent to the journal box of the sleeve 57' or against the frame bar 5, a spring 67' being arranged under compression on the sleeve and seated on the spring seat 65' and the spring seat 66', and preferably a collar 68' is secured to the sleeve adjacent to the spring seat 65'. Preferably the collars 68 and 68' are adjustably secured to the sleeves. Each spring seat 65 and 65' is provided with lugs 69.

For the purpose of directly controlling the spring seat 65 a shifting fork 70 is arranged in proximity thereto and mounted on a pivotal shaft 71 that is supported on the frame-bar 8, the fork being provided with an operating arm 72. A shifting fork 73 is arranged in proximity to the spring seat 65' and secured to a pivotal shaft 74 that is rotatably supported by the frame-bar 10 and has an operating arm 75 secured thereto. The shifting forks have slots 76 receiving the lugs 69 of the respective spring seats. A rock-shaft 77 is mounted on the frame-bars 4 and 5 in proximity to the rock-shaft 43 and has an upwardly-extending arm 78 and also a downwardly-extending arm 79 fixed thereto. A pull rod 80 is connected to the arm 78 and has a slip connection with the arm 72, preferably extending through the latter and provided with a head 81 whereby the arm may be drawn to cause further compression of the spring 67. A pull rod 82 is connected to the arm 79 and is provided with a head 83 for pulling the operating arm 75 to compress the spring 67'. A lever 84 is secured to the shaft 77 and extends upwardly adjacent to a toothed quadrant 85 which is supported upon the frame in proximity to the quadrant 51, the lever being provided with a latch 86 to coöperate with the quadrant to latch the lever. When the lever 84 is latched in mid position both of the clutch systems are permitted to operate to rotate both shafts 13 and 14. On movement of the lever in one direction one of the shafts is disconnected from the hollow gear wheel, the other clutch system releasing the other driven shaft when the lever is moved in the opposite direction beyond mid position.

For the purpose of enabling the operator to reduce the power applied to either the shaft 13 or the shaft 14 or to dis-connect both shafts from the hollow driving wheel, other means are provided and for this purpose a rock-shaft 87 is mounted on the frame in proximity to the shaft 77 and it has an upwardly-extending arm 88 thereon to which a pull rod 89 is connected, the latter being connected to the operating arm 72, and a foot lever 90 is secured to the rock-shaft 87. A rock-shaft 91 is mounted also on the frame and has an upwardly-extending arm 92 secured thereto, a lever 93 being pivotally supported by the frame and pivotally connected to the arm 92, a pull rod 94 being connected to the lever 93 and also to the operating arm 75, and a foot lever 95 is secured to the rock-shaft 91. The foot levers 90 and 95 may be moved by the operator either simultaneously or independently.

In practical use the operator will set the lever 50 so as to release one of the clutch systems on the shaft 17 to determine the direction of motion of the gearing, so that the pinion 12 upon being driven will rotate both wheels 18 and 18' and rotate the shaft 17 in the forward or reverse direction as may have been determined, the wheel 53 driving the wheel member 56 which may cause both wheels 15 and 16 to be driven if desired. The operator will manipulate the lever 84 as required in case it is desired to apply the power to either one of the wheels 15 and 16 for steering purposes. If it is desired to cause slight slipping of the clutch devices to obtain relatively less power, either one of the foot levers 90 or 95 will be operated as may be desired, or both may be operated to withhold the driving power from both wheels 15 and 16.

Having thus described the invention, what is claimed as new is—

1. A reversing controllable driving gearing including a rotary driver pinion, a plurality of driven shafts, a reversing shaft, two gears on the reversing shaft in mesh with the pinion, clutch systems normally connecting the gears to the reversing shaft, means for controlling the clutch systems to release either one of the gears from the reversing shaft, and gearing connecting the driven shafts with the reversing shaft.

2. A reversing controllable driving gearing including a reversing shaft, means for rotating the reversing shaft either in forward or the reverse direction, two driven shafts, a hollow gear wheel rotatable on the two driven shafts, a gear wheel secured to the reversing shaft in mesh with the hollow gear wheel, two clutch systems in the hollow gear wheel, separate actuating means for normally actuating the clutch systems to connect the hollow gear wheel to the two driven shafts, and a supported lever operatively connected with the actuating means of the two clutch systems for controlling them to release either one of the driven shafts from the hollow gear wheel.

3. A reversing controllable driving gearing including a rotary driver pinion, a plurality of rotatable driven shafts, a rotatable reversing shaft, two gear wheels rotatable on the reversing shaft and meshing with the pinion, two clutch systems to coöperate with the reversing shaft and also with the gear wheels respectively, a supported lever operatively connected with the two clutch systems for alternate operation thereof, a single gear wheel rotatable on the plurality of driven shafts and provided with means for connecting it to the shafts, and a gear wheel secured to the reversing shaft between the two gear wheels and in mesh with the single gear wheel.

4. In a reversing controllable driving gearing, the combination of a rotatable shaft, a sleeve splined to the shaft and having a clutch disk fixed thereto, a toothed gear wheel rotatable on the sleeve and adapted to constitute a clutch member to drive said disk, a driving gear in mesh with the toothed gear wheel, a spring-seat on the sleeve opposite to the toothed gear wheel, a device for preventing the spring-seat from moving on the sleeve in the direction from the toothed gear wheel, a spring on the sleeve and supported at one end, the opposite end of the spring being in contact with the spring-seat, and a supported shifting-fork in connection with the spring-seat.

5. In a reversing controllable driving gearing, the combination of a rotatable shaft, a sleeve splined to the shaft, a main clutch disk fixed to the sleeve, a gear wheel rotatable on the sleeve and having a rim extending about the disk, a plurality of clutch disks arranged between the main clutch disk and the wall of the gear wheel, one of the plurality of disks being splined to the sleeve, another of the plurality of disks being splined to the rim of the gear wheel, means for rotating the gear wheel, a wheel secured to the shaft to transmit motion, means for moving the sleeve in one direction, and means for moving the sleeve in the opposite direction.

6. In a reversible controllable driving gearing, the combination of a rotatable driving shaft, a beveled pinion secured to the driving shaft, two driven shafts rotatably supported at right angles to the axis of rotation of the driving shaft, a reversing shaft rotatably supported between the pinion and the driven shafts and parallel to the shafts, two dished bevel gear wheels arranged to rotate on the reversing shaft in mesh with the bevel pinion, clutch means in each of the bevel gear wheels to coöperate therewith and with the reversing shaft, a spur-tooth wheel secured to the reversing shaft between the bevel gear wheels, a casing arranged to rotate on the driven shafts and having a gear wheel fixed thereon that meshes with the spur-tooth wheel, and two clutch systems inclosed in the casing to cooperate with the driven shafts respectively and also with the inside of the casing.

7. In a reversible driving gearing, the combination of a rotatable reversing shaft, two bevel gear wheels arranged to rotate on said shaft, a rotatable bevel pinion in mesh with the two wheels, two clutch systems in said wheels respectively to connect said shaft to the wheels, two springs arranged to actuate the clutch systems respectively, two spring-seats engaging the springs respectively, two shifting-forks pivotally supported and operatively connected with the spring-seats respectively and having each an operating-arm, a wheel secured to said shaft between said bevel gear wheels for imparting motion, a supported rock-shaft having two arms extending from opposite sides respectively of the axis of rotation thereof, a pull-rod connected to one of the arms and having a slip-connection with the operating-arm of one of the shifting-forks, a pull-rod connected to the remaining arm of the rock-shaft and having a slip-connection with the operating-arm of the remaining shifting-fork, a supported quadrant, and a lever fixed to the rock-shaft to coöperate with the quadrant.

8. In a controllable driving gearing, the combination of two rotatable shafts, a hollow gear wheel arranged to rotate on said shafts, means for rotating said gear wheel, two clutch systems inclosed in said wheel, one of said systems being provided with an actuating spring controlling the system to connect one of said shafts to the inside of said gear wheel, the remaining one of said systems being provided with an actuating spring controlling the system to connect the remaining one of said shafts to the inside of said gear wheel, two spring-seats engaging the springs respectively, two shifting-forks pivotally supported and operatively connected with the spring-seats respectively and having each an operating-arm, a supported rock-shaft having two arms extending from opposite sides respectively of the axis of rotation thereof, a pull-rod connected to one of the arms and having a slip-connection with the operating-arm of one of the shifting-forks, a pull-rod connected to the remaining one of the arms of the rock-shaft and having a slip-connection with the operating-arm of the remaining one of the shifting forks, a supported quadrant, a lever fixed to the rock-shaft to coöperate with the quadrant, two independently-movable foot-levers, connections between one of the foot-levers and one of said operating-arms, and connections between the remaining one of the foot levers and the remaining one of said operating-arms.

In testimony whereof, I affix my signature in presence of two witnesses.

CHARLES A. WOOD.

Witnesses:
 ROBERT WOOD,
 A. F. GREEN.